(12) United States Patent
Merrill

(10) Patent No.: US 9,972,357 B2
(45) Date of Patent: May 15, 2018

(54) AUDIO AND VIDEO SYNCHRONIZING PERCEPTUAL MODEL

(71) Applicant: Adobe Systems Incorporated, San Jose, CA (US)

(72) Inventor: Peter Merrill, Sunnyvale, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 709 days.

(21) Appl. No.: 14/150,226

(22) Filed: Jan. 8, 2014

(65) Prior Publication Data

US 2015/0195426 A1 Jul. 9, 2015

(51) Int. Cl.
*H04N 5/04* (2006.01)
*G11B 27/034* (2006.01)
*G11B 27/10* (2006.01)
*G11B 27/28* (2006.01)
*G10L 25/63* (2013.01)

(52) U.S. Cl.
CPC ............ *G11B 27/034* (2013.01); *G11B 27/10* (2013.01); *G11B 27/28* (2013.01); *G10L 25/63* (2013.01)

(58) Field of Classification Search
CPC ....... G11B 27/034; G11B 27/10; G11B 27/28; G11B 25/63
USPC ....................................................... 348/500
See application file for complete search history.

(56) References Cited

U.S. PATENT DOCUMENTS

| 6,173,074 | B1 * | 1/2001 | Russo | G01H 3/08 367/135 |
|---|---|---|---|---|
| 6,954,894 | B1 | 10/2005 | Balnaves et al. | |
| 7,212,248 | B2 * | 5/2007 | Stanger | H04N 5/04 348/423.1 |
| 2002/0028060 | A1 * | 3/2002 | Murata | G11B 27/028 386/282 |
| 2003/0160944 | A1 | 8/2003 | Foote et al. | |
| 2006/0020880 | A1 | 1/2006 | Chen | |
| 2013/0330062 | A1 | 12/2013 | Meikle et al. | |

FOREIGN PATENT DOCUMENTS

WO WO-02052565 7/2002
WO WO-2006009521 1/2006
(Continued)

OTHER PUBLICATIONS

"Foreign Office Action", GB Application No. 1500227.2, dated Apr. 19, 2017, 4 pages.
(Continued)

*Primary Examiner* — Michael Lee
(74) *Attorney, Agent, or Firm* — Wolfe-SBMC

(57) ABSTRACT

An audio and video synchronizing perceptual model is described that is based on how a person perceives audio and/or video (e.g., how the brain processes sound and/or visual content). The relative emotional impact associated with different audio portions may be employed to determine transition points to facilitate automatic synchronization of audio data to video data to create a production that achieves a particular overall emotional effect on the listener/viewer. Various processing techniques of the perceptual model may utilize perceptual characteristics within the audio portions to determine a transition point for automatic synchronization with video data.

20 Claims, 7 Drawing Sheets

(56) References Cited

FOREIGN PATENT DOCUMENTS

| WO | WO-2006065223 | 6/2006 |
|----|---------------|--------|
| WO | WO-2012168740 | 12/2013 |

OTHER PUBLICATIONS

"Foreign Office Action", DE Application No. 102014118075.5, dated Feb. 8, 2018, 22 pages.
Fischer, "Lexicon of Computer Science—15th Edition", 2012, 43 pages.
Gruhn, "Listen and Perceive—Keynote listener? Obertonhorer? Listen types and their instruments", Feb. 2012, 16 pages.
Saenz, "Tonotopic mapping of human auditory cortex", Jul. 2013, 11 pages.

\* cited by examiner

AUDIO AND VIDEO SYNCHRONIZING PERCEPTUAL MODEL

BACKGROUND

Users increasingly look for ways to integrate audio and video. For example, a user may assign audio, such as music, to a video segment. To integrate audio and video, traditional techniques may analyze sound characteristics of the audio without taking into consideration whether hearing the audio produces an emotional impact on a listener, particularly when combined with the video segment. Further, synchronizing audio and video using traditional techniques may be time consuming and computationally intensive, and may depend upon input from a user.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

An audio and video synchronizing perceptual model is described that is based on how a person perceives audio and/or video (e.g., how the brain processes sound and/or visual content). In one implementation, perceptual characteristics of a portion of audio data are identified that are indicative of an emotional impact (e.g., a nostalgic or dramatic effect) on a listener of the portion of the audio data. An assessment of the relative emotional impact between different portions of audio data may be made based on respective characteristics. The relative emotional impact associated with different audio portions may be employed to determine transition points to facilitate automatic synchronization of audio data to video data to create a production that achieves a particular overall emotional effect on the listener/viewer.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
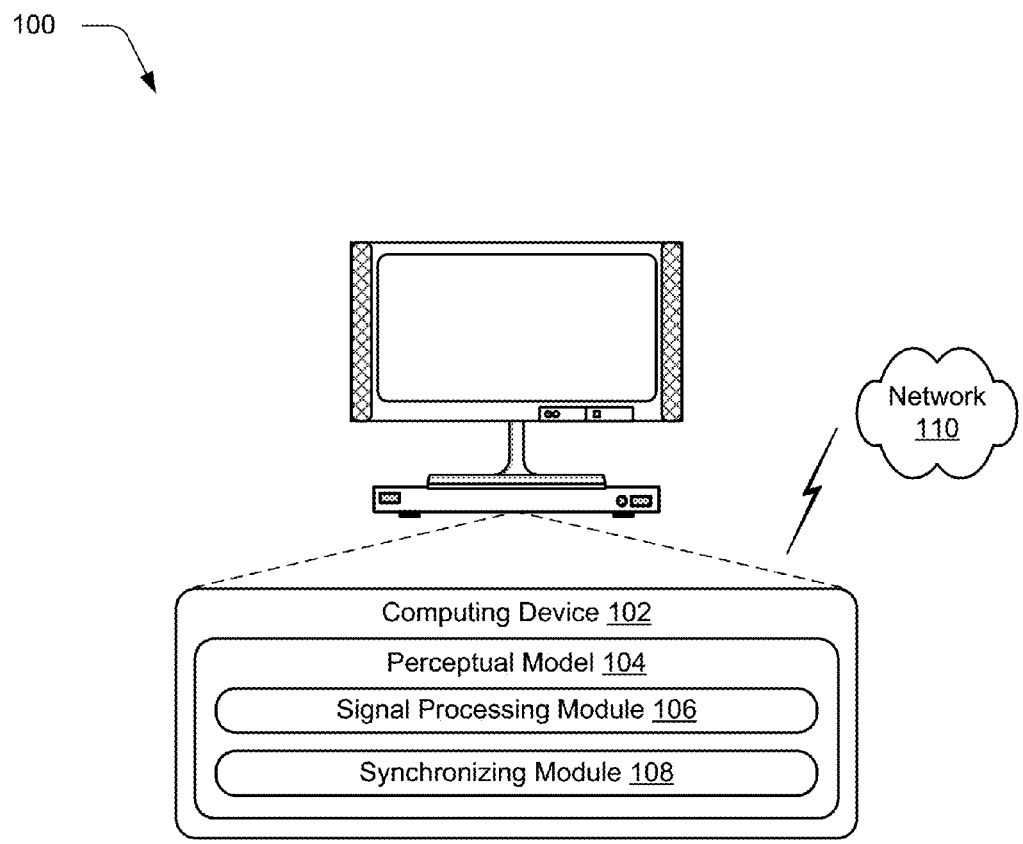
FIG. 1 is an illustration of an environment in an example implementation that is operable to employ techniques described herein.

Traditional models that analyze music to derive basic attributes of the music fail to consider how a listener perceives the music. Thus, traditional models are not well suited to finding points in audio that achieve a particular emotional response.

An audio and video synchronizing perceptual model is described that is based on how a person perceives audio and/or video (e.g., how the brain processes sound and/or visual content). In one implementation, perceptual characteristics of a portion of audio data are identified that are indicative of an emotional impact (e.g., a nostalgic effect) on a listener of the portion of the audio data. The perceptual characteristics may reflect, for example, a measure of human sensitivity when hearing the portion of the audio data. An assessment of the relative emotional impact between different portions of audio data may be made based on respective characteristics. The relative emotional impact associated with different audio portions may be employed to determine transition points to facilitate automatic synchronization of audio data to video data to create a production that achieves a particular overall emotional and/or dramatic effect on the listener/viewer.

Perceptual characteristics of a portion of audio data may be identified in a variety of manners. For instance, the perceptual characteristics may be identified by analyzing audio data, generating a spectrogram that graphically represents the audio data or the perceptual characteristics, and/or modifying the spectrogram. Responsive to identifying the perceptual characteristics, in one implementation, values indicative of the perceptual characteristics are assigned to different portions of the audio data.

Transition points in the audio data may be detected that correspond to perceptual characteristics of a portion of audio data that are indicative of an emotional impact. For example, the transition points may be detected by filtering, normalizing, applying a threshold, comparing, and/or combining the values indicative of the perceptual characteristics that are assigned to different portions of the audio data. The transition points may be used to synchronize audio with video data in various ways.

For instance, changes in a presentation of the video data may be synchronized to the transition points in the audio. Video data may be representative of an image, an image slideshow, a video clip, a video segment, and/or live video. In a slide show for example, changes between different images may be synchronized to the detected transition points. In a video segment example, changes between video frames or scenes are synchronized to the transition points in the audio. In one implementation, synchronizing the change in the video data to the detected transition points may be based on matching a pace between changes in the video data to a pace between transition points in the audio data. By synchronizing changes in a presentation of the video data to the transition points in the audio, the drama, emotion, excitement, and/or mood of the audio is matched to potentially corresponding drama, emotion, excitement, and/or mood in the presentation of the video data.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 and a perceptual model 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The perceptual model 104 is illustrated as including a signal processing module 106 and a synchronizing module 108. In one implementation, the perceptual model 104 is operable to employ techniques for identifying perceptual characteristics of a portion of audio data that are indicative of an emotional impact (e.g., ability to induce a particular feeling or mood) on a listener of the portion of the audio data. Additionally or alternatively, the perceptual model 104 is operable to employ techniques for synchronizing a portion of audio data with changes in video data based on determined perceptual characteristics for the portion of the audio data. For example, the perceptual model 104 may be configured to determine transition points in the audio data that are based on the perceptual characteristics and automatically configure a production to synchronize the changes in the video data to the transition points. By way of example and not limitation, a feeling of happiness may be invoked when a viewer views a video segment having the transition points synchronized to the video data using the techniques described herein.

In at least some implementations, the perceptual model 104 may be generated from, or alternatively updated by, a learning model. For example, the perceptual model 104 may receive information describing how a human brain processes sound or may receive information describing human sensitivity, or human emotion, associated with particular sounds. Using the received information, the perceptual model 104 may be configured to find a portion of the audio data that produces a desired emotion. For example, the perceptual model 104 may find one or more portions of the audio data that produce a positive or negative emotion. In one specific example, responsive to receiving an input to find a particular emotion, the perceptual model 104 identifies at least one portion of audio (e.g., transition point) that produces the particular emotion.

In one or more implementations, the perceptual model 104 generates a representation of received audio data such that the techniques performed by the perceptual model 104 are applied to the representation of the audio data.

The signal processing module 106 may be configured to process audio data associated with a corresponding audio signal to generate perceptual characteristics for different portions of the audio data (e.g., points or periods of time within the audio data). The perceptual characteristics represent a level of perceptual significance for each different portion of the audio data, and may include, in one specific example, an impact value, a rhythmic impulse value, a rhythm value, a melodic value, or a combination thereof. The impact value may represent, for example, what a person listens for in music (e.g., how the inner ear processes sound and/or the brain's attention to an individual audio occurrence). By way of example, the impact value may be indicative of rapid changes in loud and soft volumes, silent portions preceding or following loud portions, or a combination thereof. In one specific example, the impact value represents a measure of emotive intensity on a human listener.

The rhythmic impulse value may represent, for example, sounds spread relatively evenly over the frequency spectrum of portions of the audio data. For example, the rhythmic impulse value may be indicative of loudness spread relatively evenly over the frequency spectrum of a portion of the audio data relative to another portion of the audio data.

By way of example, the rhythm value may be indicative of rhythm or harmony for the portion of the audio data that contribute to the rhythm perceived by a listener. Meanwhile, the melodic value may represent, for example, a melody (e.g., a dominate frequency with overtones above the dominate frequency) corresponding to the portion of audio data or a degree of change in a harmonic feature over time.

The signal processing module 106 may be configured to process the audio data to generate the perceptual characteristics using a variety of different operations. Examples of these operations may include converting an audio signal into a spectrogram, mapping the spectrogram into a perceptual frequency space, normalizing a dynamic range of the spectrogram, and/or processing values resultant from the normalizing (e.g., applying a frequency specific attenuation function or a threshold to the normalized spectrogram). Generation of the perceptual characteristics is further described in relation to FIG. 2-6.

The synchronizing module 108 may be configured to synchronize audio data to a change in video data to create a production that achieves a particular overall emotional, dramatic, and/or attention inducing effect on a listener or viewer. In one specific example, the synchronizing module 108 may be configured to process the perceptual characteristics to determine, generate, or select a transition point within the audio data that produces a designated emotional response in a listener. In one specific example, an impact value, a rhythmic impulse value, a rhythm value and/or a melodic value for different portions of the audio data are filtered to determine one or more transition points in the audio data.

In at least some implementations, the synchronizing module 108 may automatically configure a production to synchronize changes in video data to one or more transition points that are determined. Therefore, in this implementation, the synchronizing module 108 configures the production to synchronize changes in the video data to the one or more transition points without user input. Alternatively, in other implementations a user may provide input via a user interface to synchronize changes in the video data to the one or more transition points.

In one implementation, the synchronizing module 108 may be configured to synchronize changes in video data to the detected transition points based on matching a pace between two changes in the video data to a pace between transition points in the audio data. In this implementation, the synchronizing module 108 synchronizes changes in video data to the detected transition points based on the pace between the two changes in the video data being substantially similar to the pace between the transition points in the audio data.

In another implementation, the synchronizing module 108 may be configured to synchronize changes in video data to the detected transition points based on matching a smoothness or abruptness between two changes in the video data (e.g., changes between video frames or scenes) to a smoothness or abruptness between transition points in the audio data. In this implementation, the synchronizing module 108 synchronizes changes in video data to the detected transition points based on the smoothness or abruptness between the two changes in the video data being substantially similar to the smoothness or abruptness between the transition points in the audio data.

Although the perceptual model 104 is illustrated as being implemented on the computing device 102 it should be readily apparent that other implementations are also contemplated in which the perceptual model 104 is implemented on a separate device such as a remote server, a local server, or other remote computing device. Further, although illustrated as being provided by a computing device 102 in a desktop configuration, a variety of other configurations are also contemplated, such as remotely over a network 110 as part of a web platform as further described in relation to FIG. 6.

Regardless of where implemented, the perceptual model 104 is representative of functionality that is configured to process audio data to identify portions of the audio data that yields a particular emotional effect on a listener.

Figure 2:
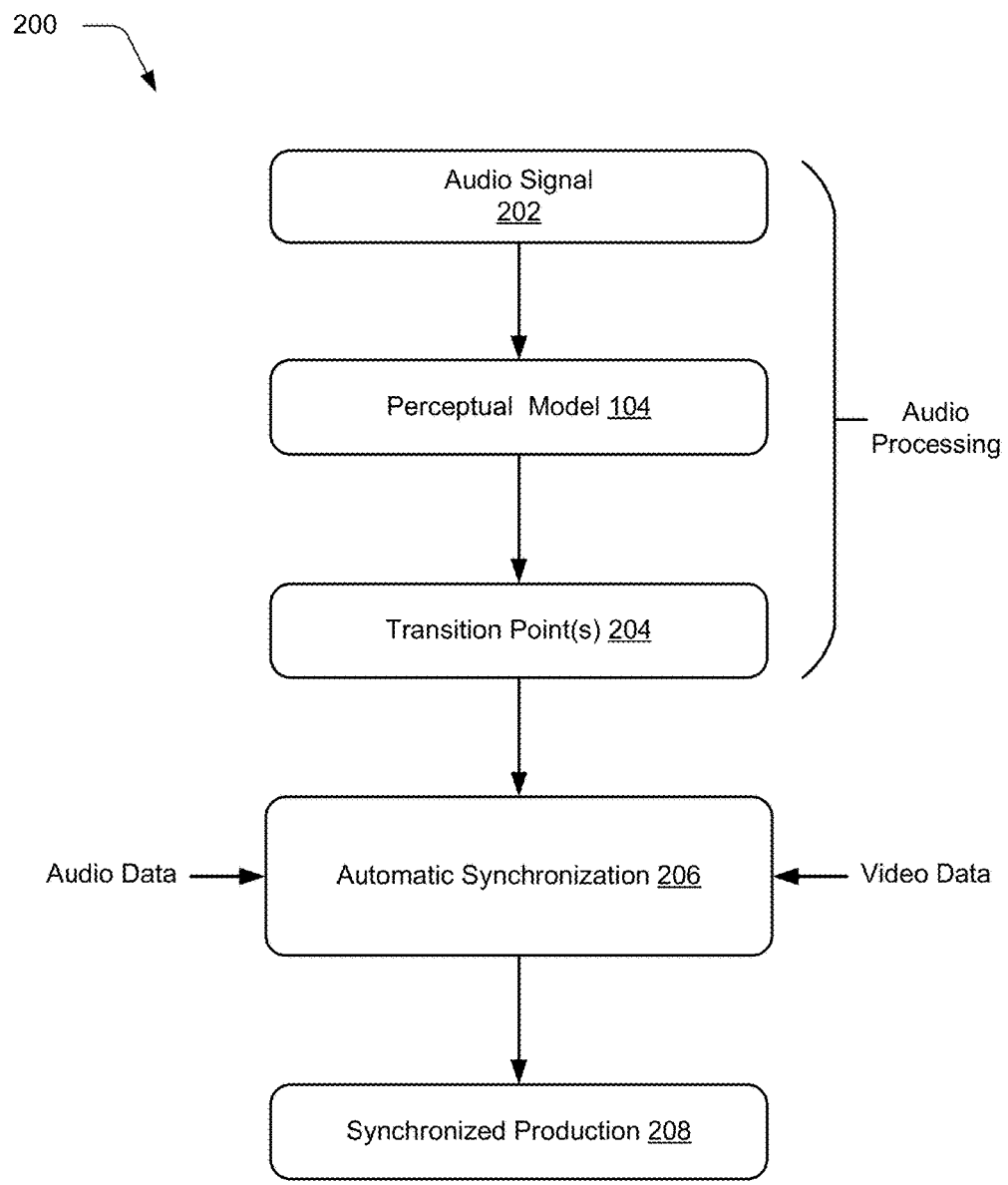
FIG. 2 depicts a representation of a scenario in an example implementation in which the perceptual model performs audio processing to automatically synchronize audio data and video data.

FIG. 2 depicts generally at 200 a representation of a scenario in an example implementation in which the perceptual model 104 of FIG. 1 performs audio processing to automatically synchronize audio data and video data. As represented in FIG. 2, audio processing may occur in which an audio signal 202 is processed according to the perceptual model 104 to determine one or more transition points 204 for the audio signal. In one implementation, the one or more transition points 204 may be employed for automatic synchronization 206 in which audio data associated with the one or more transition points 204 is synchronized to video data. Here, the audio data and video data are combined based on transition points that are ascertained through the processing to create a synchronized production 208. In addition or alternatively, after the perceptual model 104 performs audio processing and determines the transition point 204, values associated with the one or more transition points 204 may be stored in memory (e.g., either locally or remote) for later use.

In particular, the audio signal 202 may include, for example, associated audio data to be processed by the perceptual model 104. The audio signal 202 may be representative of any type of sound (with or without speech), such as music (with or without rhythm). In one specific implementation, the audio signal 202 includes low resolution audio data and the perceptual model 104 processes the low resolution audio data.

One or more transition points 204 may be used during automatic synchronization 206. For example, the perceptual model 104 may identify multiple "potential" transition points and select some or all of the transition points for synchronization to achieve a designated emotional response in the listener (relative to other, non-selected transition points in a set of potential transition points). In this example, the perceptual model 104 may be configured to assign a score and/or weight to each transition point in the set of transition points. In some instances, the score and/or weight are assigned after processing each transition point in the set of transition points (e.g., adjusting or modifying the determined transition point). Additional details regarding processing of transition points are described in relation to FIG. 3 below.

The automatic synchronization 206 may be configured to create the synchronized production 208 by inserting, aligning, joining, cropping, rearranging, modifying, and/or otherwise performing operations upon portions of the audio and video data suitable to synchronize the audio data with one or more changes in the video data according to the transition points 204 that are selected. This may be enabled, for example by the perceptual model 104. Accordingly, the synchronized production 208 is configured to include audio data that is synchronized with video changes at the transition point(s) 204 thereby producing a designated emotional response in a listener or viewer of the production.

Figure 3:
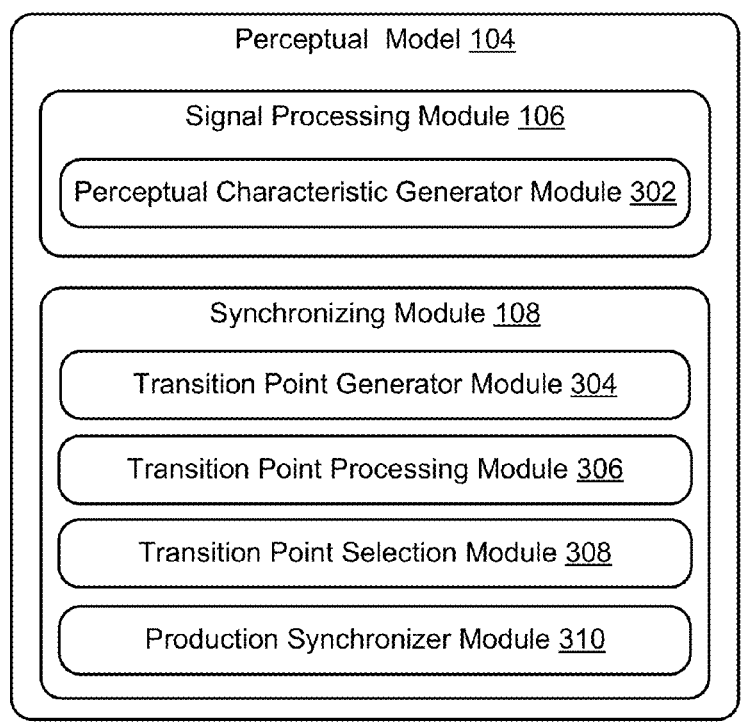
FIG. 3 depicts an example perceptual model to employ techniques described herein.

FIG. 3 depicts an example perceptual model 300 to employ techniques described herein. For instance, as illustrated the perceptual model 104 includes the signal processing module 106, the synchronizing module 108, a perceptual characteristics generator module 302, a transition point generator module 304, a transition point processing module 306, a transition point selection module 308, and a production synchronizer module 310.

As illustrated, the signal processing module 106 includes a perceptual characteristics generator module 302. The signal processing module 106 mentioned previously may be configured to process audio data associated with a corresponding audio signal to generate perceptual characteristics for different portions of audio data. The perceptual characteristics represent a level of perceptual significance for the different portions of the audio data.

The perceptual characteristics generator module 302 generates perceptual characteristics for different portions of audio data. The perceptual characteristics may include one or more values indicative of impact of a production on a user, such as an impact value, a rhythmic impulse value, a rhythm value, and/or a melodic value associated with audio data. A variety of different operations may be employed to generate the perceptual characteristics. Examples of these operations may include but are not limited to converting an audio signal into a spectrogram, mapping the spectrogram into a perceptual frequency space (e.g., perceptual frequency scale), normalizing a dynamic range of the spectrogram, and/or processing values resultant from the normalizing. In one example, the perceptual characteristics generator 302 is configured to generate an impact value, a rhythmic impulse value, a rhythm value and/or a melodic value.

An impact value may be generated by multiplying an absolute loudness and a change in loudness over time. Here, the loudness may be determined by applying a mapping function to the spectrogram in the perceptual frequency space. In some examples, the loudness used to generate the impact value may be normalized from 0 to 1.

A rhythmic impulse value may be generated by analyzing loudness spread over an audio frequency spectrum. For example, loudness may be determined by applying a mapping function to the spectrogram in the perceptual frequency space. Analyzing the loudness may include determining how evenly the loudness is spread over the audio frequency spectrum. Additionally or alternatively, a rhythmic impulse value may be generated by applying conventional filtering techniques to the spectrogram. In this example, the filter may be applied at a sampling resolution between approximately 25-50 milliseconds. In one implementation, the rhythmic impulse may be generated by filtering out melodic content.

The perceptual characteristics generator 302 may determine or generate the rhythm value by applying a threshold to values of the normalized spectrogram. In another example, the perceptual characteristics generator 302 may determine or generate the melodic value by applying a frequency specific attenuation function to the normalized spectrogram. Additionally or alternatively, the perceptual characteristics generator 302 may determine or generate the melodic value by applying a processing technique that analyzes a degree of change in harmonic features of the audio data over a particular time period. The perceptual characteristics generator 302 may be further configured to derive other kinds of perceptual characteristics indicative of an impact of a production on a user in addition to or in lieu of being configured to generate an impact, a rhythmic impulse, a rhythm, and/or melodic values.

In one or more implementations, the perceptual characteristics are stored locally in storage at the computing device 102. In addition or alternatively, the perceptual characteristics may be stored in, and/or be accessible from, storage remote from the computing device 102, such as in a remote database or a remote server.

The perceptual characteristics may be generated by converting the audio signal into a spectrogram using various techniques. For example, the converting may include generating the spectrogram by applying a Fast Fourier Transform (FFT) to the audio signal (or corresponding audio data). Further, the FFT may be applied at a time resolution that matches an encoding format of the audio signal or audio data. For instance, the encoding format may include MP3, Advanced Audio Coding (AAC), WAV, and/or WMA to name a few examples.

Additionally or alternatively, the perceptual characteristics may be generated by mapping a spectrogram of the audio signal into a perceptual frequency space, which may include mapping the spectrogram to Equivalent Rectangular Bandwidth (ERB) space. This approach may involve normalizing a dynamic range of a spectrogram of the audio signal, such as by normalizing the spectrogram between values of zero and one or using another designated normalization value range. In one or more implementations, the normalizing may be performed responsive to a triggering event such as mapping a spectrogram of an audio signal into a perceptual frequency space, conversion of the audio signal into a spectrogram, or another trigger.

Continuing with example operations for generating the perceptual characteristics, the perceptual characteristics generator 302 may be configured to recognize that a spectrogram of the audio signal includes an ERB axis and a time axis. In response to the recognition, the perceptual characteristics generator 302 may operate to calculate a difference for each of the values along the ERB axis at one or more points along the time axis. In other words, the perceptual characteristics generator 302 may calculate a first derivative along the time axis using standard techniques in the art. In one or more implementations, each of the difference values may be summed at each time by applying a frequency specific attenuation function along the ERB axis. The result derived from this summing is the melodic value that may be employed as one value indicative of perceptual characteristics in techniques described herein. Another value indicative of the perceptual characteristics is determined by applying a threshold to the result of summing each of the difference values mentioned above. Alternatively, the rhythm value may be determined by applying a threshold to each value along the ERB axis before summing each of the difference values. In either case, the value that is derived from applying the threshold is referred to as the rhythm value herein. The threshold that is applied may be a range of values, or a value above or below a specific value. For example, the threshold may specify a value between 0.1 and 0.4.

As further illustrated, the synchronizing module 108 includes the transition point generator module 304, the transition point processing module 306, the transition point selection module 308, and the production synchronizer module 310. The synchronizing module 108 is configured to synchronize audio data to a change in video data to create a production that achieves a particular overall emotional effect on a listener or viewer.

The transition point generator module 304 is configured to determine transition points within audio data. The transition points may be identified or determined using a variety of different operations. In one example, identifying the transition points is enabled by filtering one or more of the perceptual characteristics generated by the perceptual characteristics generator module 302. For instance, one or more transition points may be identified by applying a comb filter to one or more rhythmic impulse values or using other filters in a comparable way to detect perceptual characteristics associated with different portions of audio data. In one specific example, a comb filter may be applied to an array of rhythmic impulse values.

In addition or alternatively, transition points may be determined by integrating two or more perceptual characteristics over time that exceed a threshold. For instance, responsive to determining that values (e.g., rhythmic impulse values or impact values) indicative of the two or more perceptual characteristics exceed a minimum threshold value, the two or more perceptual characteristics are combined. The combined perceptual characteristic values for different portions of audio may then be compared one to another to select transition points that meet designated criteria.

The transition point processing module 306 processes one or more determined transition points. Processing of the one or more transition points may include a combination of operations including one or more of normalizing transition points to a standard deviation of the transition points over a particular time frame, accentuating the transition point(s), applying weights to the transition point(s), comparing scores associated with two or more transition points, and/or determining a pace between two or more transition points. By processing the one or more transition points, consideration may be given to rapid changes in volume and/or spacing between loud and soft portions of the audio, thereby allowing the processed transition point to reflect a greater perceived emotional impact on a listener relative to a non-processed transition point.

Further, the transition point processing module 306 may be configured to normalize transition points to a standard deviation of the transition points over a particular time frame. Generally, a time frame on the order of a few seconds or fractions of a second is employed (e.g., an interval in the range of 0 to 5 seconds), although larger time frames (e.g., more than 5 seconds) may also be selected. For example, the transition points may be normalized to a standard deviation over all transition points in a 1.5 second time period or other time frame. By normalizing the transition points as described, rapid changes in volume are exaggerated in a way that emulates how the brain possibly processes sound.

Additionally or alternatively, the transition point processing module 306 may accentuate the one or more transition points to amplify the designated emotional response in the listener. This may be accomplished, for example, by adjusting a peak energy value corresponding to at least one transition point. The peak energy value may be a numerical value representing an ability for a transition point to produce a designated emotional response in a listener. Adjusting the peak energy value may include, for example, increasing or decreasing loudness for the associated production.

Weights may be applied to the transition points based on one or more criteria. In some examples, weights may be applied to one or more transition points based on a loudness or silence associated with the transition point, a change in loudness or silence of the transition point relative to loudness or silence of another transition point, and/or a degree of adjustment to the peak energy value corresponding to the transition point. Additionally or alternatively, a weight may be applied to a transition point to indicate how closely the transition point matches a desired pace between transition points. For example, a weight may be applied to a transition point to indicate its association with a particular emotion.

Processing by the transition point processing module 306 may also include comparing scores associated with two or more transition points. Scores may be assigned to a transition point based on a plurality of factors which may include, for example, a strength of volume of the transition point or a change in volume of the transition point relative to another transition point (e.g., a transition point that preceded or follows). Accordingly, a score assigned to a transition point may, in some examples, reflect the 'hardness' of the transition point. For example, a hard transition may be indicative of a sudden change in volume or loudness from one transition point to another, whereas a soft transition may be indicative of a slow change in volume or loudness from one transition point to another.

Additionally or alternatively, a score may be assigned to a transition point based on a temporal factor. For example, an assigned score may be based on a degree of change in volume or loudness over a particular time period before and/or after a transition point. In this example, the assigned score may be thought of as a 'pop' score due to the score being reflective of a likelihood for the transition point to capture a listener's attention. For instance, a higher 'pop' score may be assigned to a transition point having a rapid onset of loudness over a particular time period, whereas a lower 'pop' score may be assigned to a transition point having a slower onset of loudness over a particular time period. In one or more implementations, an assigned score may be normalized between 0 and 1. By comparing the scores associated with the two or more transition points one to another, a particular transition point (or multiple transition points) may be selected for synchronizing to a change in video data, discussed above and below.

Optionally, processing by the transition point processing module 306 may also include deleting one or more transition points from a set of determined transition points to create a desired pace between two transition points. For example, transition points that are too close to one another or are too jarring (e.g., exhibit a rapid change in volume relative to an adjacent transition point) may not be pleasing to a listener. In this example, a transition point may be deleted to 'slow the pace' between transition points to produce more dramatic or pleasing transition points for synchronization. Deleting a transition point may be particularly helpful in examples when a quiet section in audio has two transition points so close together that including both would appear jarring. To select a transition point for deletion, the perceptual characteristics used to determine the particular transition point are compared to a threshold (e.g., if the melodic value associated with the transition point is below a threshold, then the transition point is deleted from the set of determined transition points). Thus, a desired pace between transition points may be created by selectively deleting one or more transition points. In some examples, a desired pace between transition points may be substantially equal to the most commonly present frequency in an audio signal.

Responsive to detecting or processing the transition points, the perceptual model 104 may be configured to cause data indicative of the transition points to be saved for use in a variety of manners. In one specific example, data indicative of the transition points is saved based, at least in part, on comparing a score or weight to other transition points. As mentioned, the data indicative of the transition points may be saved locally and/or remotely. Additionally, the transition points may be used (with or without saving) to generate a synchronized production 208 through automatic synchronization 206.

In particular, the transition point selection module 308 may be configured to select one or more of the transition points as a point at which a change in video data when synchronized to the audio data at the transition point produces a designated emotional response in a listener (e.g., yields a maximum emotional and/or nostalgic effect on a listener). For example, the transition point may be selected by comparing a weight or score assigned to different transition points. In one or more implementations, a transition point may be processed after being selected as described herein.

In one or more implementations, transition points may have been previously determined and stored as data in memory (e.g., local or remote). Here, the previously determined transition points may be retrieved by the perceptual model 104 from local memory, a remote database, a remote server, or a remote storage service. In one specific example, a user interface (local or remote) may send a request for automatic synchronization to the perceptual model 104 and responsive to receiving the request, the perceptual model 104 retrieves the previously determine transition points and causes them to be synchronized with a change in video data.

The transition point selection module 308 may be further configured to select the one or more transition points based on a pace between two or more changes in the video data being substantially similar to a pace between two or more transition points. In this approach, the desired pace between the two transition points is matched to a pace between frames or scenes in the video data.

The production synchronizer module 310 may be configured to create a production that synchronizes audio data to a change in video data. For example, the production synchronizer module 310 may automatically configure a production to synchronize changes in the video data to the one or more transition points that are determined and/or accentuated. For example, the 'pop' score assigned to the one or more transition points may enable the production synchronizer module 310 to automatically configure a production to synchronize changes in the video data.

Various actions such as analyzing, determining, receiving, storing, generating, mapping, and so forth performed by various modules are discussed herein. It should be appreciated that the various modules may be configured in various combinations with functionality to cause these and other actions to be performed. Functionality associated with a particular module may be further divided among different modules and/or the functionality represented by multiple modules may be combined together into a single logical module. Moreover, a particular module may be configured to cause performance of action directly by the particular module. In addition or alternatively the particular module may cause particular actions by invoking or otherwise accessing other components or modules to perform the particular actions (or perform the actions in conjunction with that particular module).

Example Procedures

The following discussion describes perceptual model techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, any one or more blocks of the procedure may be combined together or omitted entirely in different implementations. Moreover, blocks associated with different representative procedures and corresponding figures herein may be applied together. Thus, the individual operations specified across the various different procedures may be used in any suitable combinations and are not limited to the particular combinations represented by the example figures. In portions of the following discussion, reference may be made to the examples of FIGS. 1-3.

Figure 4:
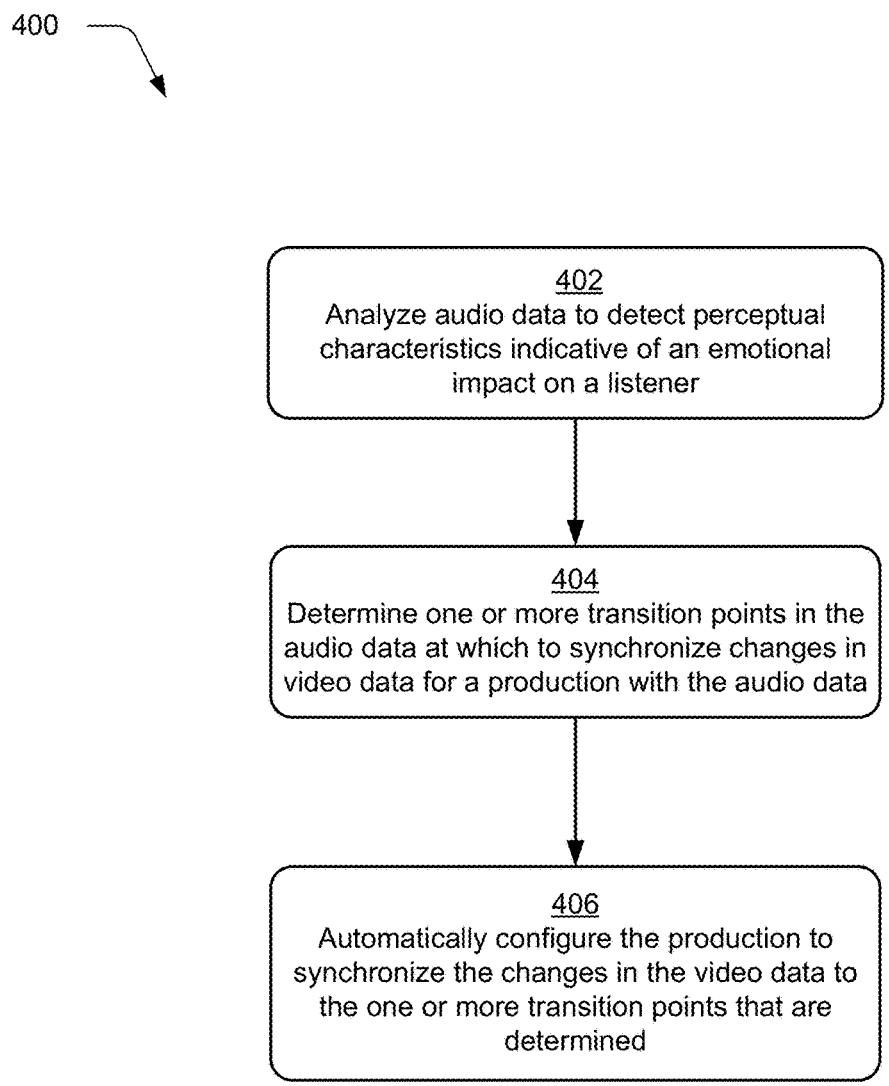
FIG. 4 is a flow diagram depicting a procedure in which the perceptual model determines transition points in audio data at which to synchronize changes in video data for a production.

FIG. 4 is a flow diagram depicting a procedure 400 in which the perceptual model determines transition points in audio data at which to synchronize changes in video data for a production.

Audio data is analyzed to detect perceptual characteristics indicative of an emotional impact on a listener (block 402). For example, the perceptual model 104 may process audio data associated with audio signal 202 using any of the techniques described herein. The processing may include operations by the signal processing module 106 of the perceptual model 104 to convert an audio signal into a spectrogram, map the spectrogram into a perceptual frequency space, normalize a dynamic range of the spectrogram, apply a threshold to the normalized spectrogram, and/or apply a frequency specific attenuation function to the normalized spectrogram. The perceptual model 104 uses the processed audio data to detect the perceptual characteristics indicative of the emotional impact on the listener at different points or portions within the audio signal 202. Further, the detected perceptual characteristics indicative of the emotional impact on the listener may include an impact, a rhythmic impulse, a rhythm, and/or melodic values as well as other values indicative of perceptual characteristics.

Based at least in part on the perceptual characteristics that are detected, one or more transition points are detected in the audio data at which to synchronize changes in video data for a production with the audio data (block 404). For instance, the perceptual model 104 may determine a transition point in the audio data by filtering one or more of the perceptual characteristics. In one or more implementations, the determined transition points may be further processed as described herein (e.g., comparing weight of transition points one to another or determining a pace between transition points).

The production is automatically configured to synchronize the changes in the video data to the one or more transition points that are determined (block 406). For instance, the synchronizing module 108 may configure the production to synchronize the changes in the video data to the one or more determined transition points in various ways, examples of which are described in this document. In at least some implementations, the one or more transition points are modified to accentuate the emotional impact on the listener by adjusting a peak energy value corresponding to at least one transition point. Adjusting the peak energy value may include, for example, increasing or decreasing loudness at the particular transition point.

Figure 5:
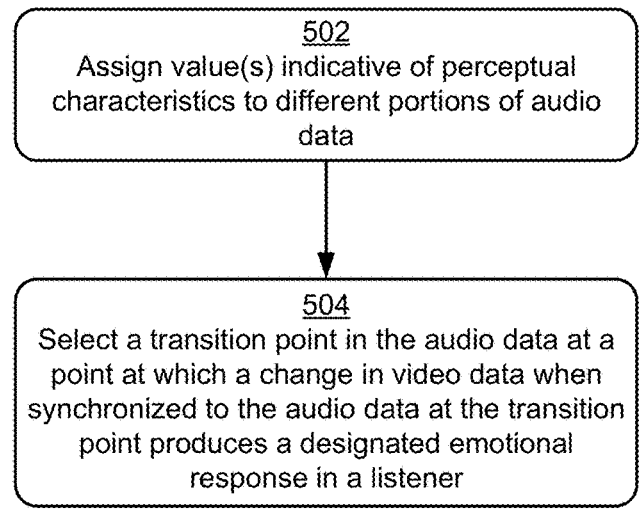
FIG. 5 is a flow diagram depicting a procedure in which the perceptual model selects a transition point in the audio data that, when synchronized to a change in video data, produces a designated emotional response in a listener.

FIG. 5 is a flow diagram depicting a procedure 500 in which the perceptual model selects a transition point in the audio data that, when synchronized to a change in video data, produces a designated emotional response in a listener.

One or more values indicative of perceptual characteristics are assigned to different portions of audio data based, at least in part, on a spectrogram generated to represent the perceptual characteristics (block 502). For example, the perceptual model 104 may assign a rhythm impulse value and/or a an impact value to different portions of audio data based on operations performed by the signal processing module 106, some examples of which were discussed above in relation to FIGS. 1-4.

A transition point is selected in the audio data as a point at which a change in video data, when synchronized to the audio data at the transition point, produces a designated emotional response in a listener (block 504). For instance, the perceptual model 104 may compare the associated values indicative of the perceptual characteristics (e.g., a rhythm impulse value and/or an impact value) one to another to select the transition point from a set of determined transition points. Producing the designated emotional response in the listener may include selecting a transition point that is associated with a particular emotion (e.g., excited, happy, calm, etc.). For instance, a transition point may be selected based on an assigned weight indicative of its association with the particular emotion.

Figure 6:
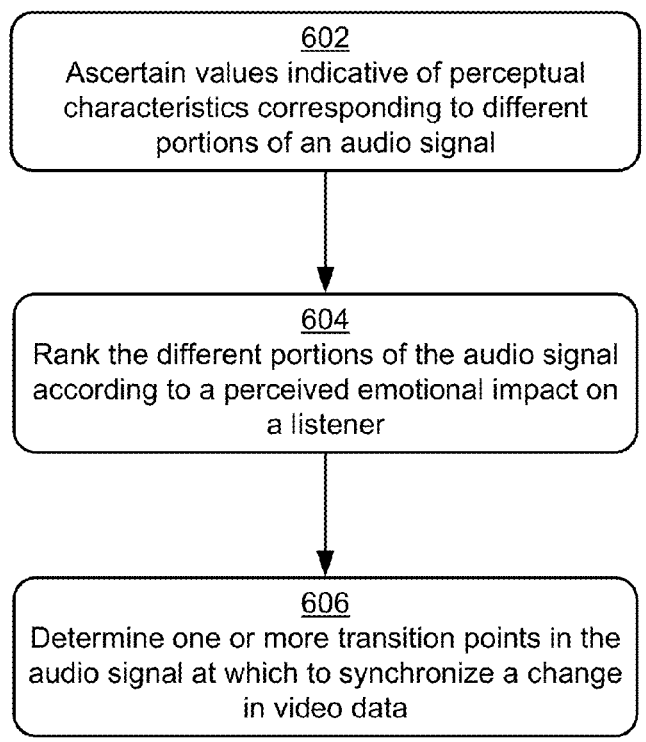
FIG. 6 is a flow diagram depicting a procedure in which the perceptual model ranks different portions of an audio signal based on values indicative of perceptual characteristics corresponding to the different portions.

FIG. 6 is a flow diagram depicting a procedure 600 in which the perceptual model ranks different portions of an audio signal based on values indicative of perceptual characteristics corresponding to the different portions.

Values indicative of perceptual characteristics corresponding to different portions of an audio signal are ascertained (block 602). For example, the perceptual model 104 may process an audio signal 202 and generate values indicative of the perceptual characteristics as discussed herein in relation to FIGS. 2-3 and elsewhere.

The different portions of the audio signal are ranked according to a perceived emotional impact on a listener based, at least in part, on the ascertained values (block 604). For example, the perceptual model 104 may rank the different portions of the audio signal according to the ascertained values that are indicative of inducing the perceived emotional impact on the listener. For example, the perceptual model 104 may assign a score to two or more of the ascertained values and then compare the scores in order to rank the ascertained values. Any suitable scoring technique may be used to implement the techniques described in this document.

One or more transition points are determined in the audio signal at which to synchronize a change in video data based on the ranking of the different portions of the audio signal (block 606). For example, the synchronizing module 108 may use the ranking to automatically determine the one or more transition points in the audio signal at which to synchronize the change in the video data. A synchronized production may then be created in the manner previously described for output to a viewer.

Example System and Device

Figure 7:
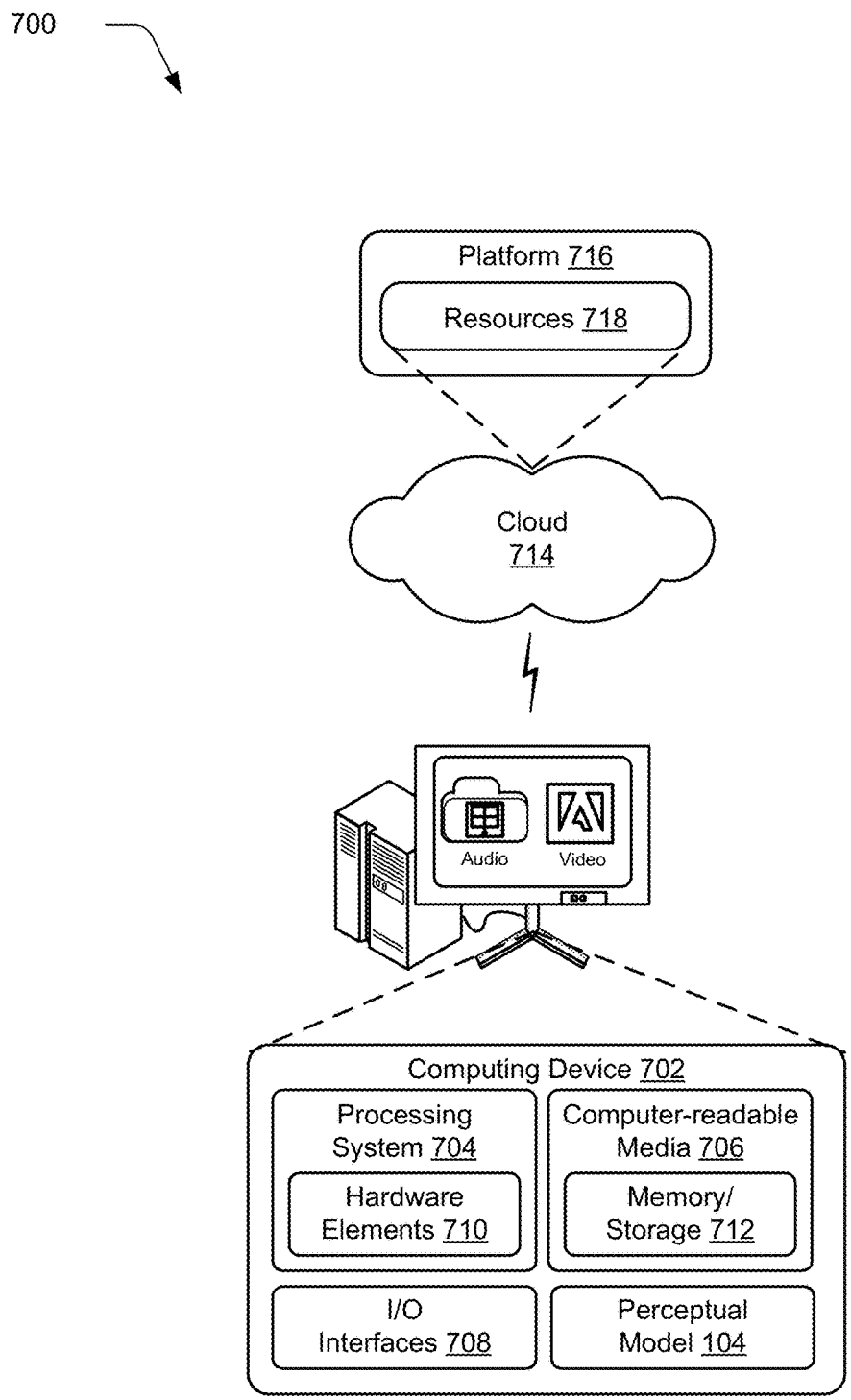
FIG. 7 illustrates an example system including an example device that is representative of one or more computing systems and/or devices that may implement the various techniques described herein.

FIG. 7 illustrates an example system 700 that, generally, includes an example computing device 702 that is representative of one or more computing systems and/or devices that may implement the various techniques described herein. This is illustrated through inclusion of the perceptual model 104, which may be configured to process audio data. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in at least some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method comprising:
analyzing audio data to detect perceptual characteristics indicative of an emotional impact on a listener;
assigning values indicative of the detected perceptual characteristics to different portions of the audio data;
normalizing the assigned values indicative of the detected perceptual characteristics;
processing the normalized values by one of applying a threshold to the normalized values or applying an attenuation function to the normalized values;
determining one or more transition points in the audio data at which to synchronize changes in video data for a production with the audio data based, at least in part, on the processing; and
automatically configuring the production to synchronize the changes in the video data to the one or more transition points that are determined to cause the detected perceptual characteristics indicative of the emotional impact on the listener in the audio data to automatically synchronize with the changes in the video data.

2. A method as described in claim 1, wherein the values indicative of the detected perceptual characteristics include at least a rhythm value indicative of rhythm content of the audio data.

3. A method as described in claim 1, wherein to detect the perceptual characteristics comprises:
generating a spectrogram of the audio data using a Fast Fourier Transform (FFT);
mapping the spectrogram to a perceptual frequency space; and
responsive to the mapping, normalizing the assigned values to normalize a dynamic range of the spectrogram.

4. A method as described in claim 3, wherein a value for a first perceptual characteristic is detected by applying the threshold to the normalized spectrogram.

5. A method as described in claim 3, wherein a value for a second perceptual characteristic is detected by applying a frequency specific attenuation function to the normalized spectrogram.

6. A method as described in claim 1, wherein the assigned values indicative of the detected perceptual characteristics are further determined by performing transition-point identification operations including:
filtering the assigned values indicative of the detected perceptual characteristics;
integrating two or more perceptual characteristics that exceed the threshold; and
comparing combined perceptual characteristic values for the different portions of the audio data.

7. A method as described in claim 1, further comprising, prior to automatically configuring the production to synchronize the changes in the video data to the one or more transition points, processing the one or more transition points to accentuate the emotional impact on the listener.

8. A method as described in claim 7, wherein processing the one or more transition points includes one or more of:
normalizing the one or more transition points to a standard deviation of the one or more transition points over a particular timeframe;
adjusting a peak energy value corresponding to the one or more transition points;
applying weights to the one or more transition points;
comparing scores associated with two or more transition points; or
determining a pace between two or more transition points.

9. A system comprising:
one or more modules implemented in hardware, the one or more modules configured to:
- generate a spectrogram by converting audio data into the spectrogram, the spectrogram representing perceptual characteristics indicative of an emotional impact on a listener for different portions of the audio data;
- normalize the spectrogram;
- assign one or more values indicative of the perceptual characteristics to the different portions of the audio data based, at least in part, on the normalized spectrogram;
- based on a comparison of the assigned values indicative of the perceptual characteristics one to another, select a transition point in the audio data as a point at which a change in video data when synchronized to the audio data at the transition point produces a designated emotional response in a listener; and
- generate digital content comprising a production in which the change in the video data is synchronized to the audio data at the transition point.

10. A system as described in claim 9, wherein the one or more values indicative of the perceptual characteristics includes an impact value representing a measure of emotive intensity on a human listener.

11. A system as described in claim 9, wherein the spectrogram generated to represent the perceptual characteristics is generated by further applying a Fast Fourier Transform to the audio data at a time resolution that matches an encoding format of the audio.

12. A system as described in claim 9, wherein the one or more values indicative of the perceptual characteristics includes a rhythmic impulse value representing sounds spread relatively evenly at a respective portion of the audio data as indicated by the normalized spectrogram.

13. A system as described in claim 9, wherein the one or more modules are further configured to synchronize the transition point of the audio data with the video data based, at least in part, on the assigned one or more values indicative of perceptual characteristics.

14. A system as described in claim 9, wherein comparing the assigned one or more values one to another includes comparing peak energy for each respective value as indicated by the normalized spectrogram.

15. A system as described in claim 9, wherein the one or more modules are further configured to accentuate the audio data corresponding to the selected transition point to amplify the designated emotional response in the listener.

16. A system as described in claim 9, wherein the one or more modules are further configured to combine two or more of the values indicative of the perceptual characteristics prior to comparing the assigned one or more values one to another.

17. A system as described in claim 9, wherein the spectrogram further is generated by:
- mapping the spectrogram into a perceptual frequency space;
- normalizing the spectrogram by normalizing a dynamic range of the spectrogram; and
- applying a frequency specific attenuation function to the normalized spectrogram.

18. One or more non-transitory computer-readable storage media storing instructions that, responsive to execution by a computing device, cause the computing device to perform operations comprising:
- converting audio data into a spectrogram that represents perceptual characteristics indicative of a perceived emotional impact on a listener for different portions of the audio data;
- normalizing the spectrogram;
- ascertaining values indicative of the perceptual characteristics corresponding to the different portions of the audio signal based on the normalized spectrogram;
- ranking the different portions of the audio signal according to the perceived emotional impact on the listener based, at least in part, on the ascertained values;
- determining, based on the ranking of the different portions of the audio signal, one or more transition points in the audio signal at which to synchronize a change in video data; and
- generating digital content comprising a production in which the change in the video data is synchronized to the audio signal at a determined transition point.

19. One or more computer-readable storage media as described in claim 18, wherein the instructions cause the computing device to perform further operations comprising adjusting an energy value of at least one transition point in the audio signal to alter the perceived emotional impact on the listener during playback of the respective transition point.

20. One or more computer-readable storage media as described in claim 18, wherein the instructions cause the computing device to perform further operations comprising scoring the ascertained values and comparing the scores, one to another, such that the ranking is based on the scoring and the comparing.

* * * * *